United States Patent [19]

Ryan

[11] Patent Number: 5,590,194
[45] Date of Patent: Dec. 31, 1996

[54] METHOD OF AND APPARATUS FOR SCRAMBLING A VIDEO SIGNAL WITH FULL NETWORK TRANSMISSION AND RECORDING CAPABILITY

[75] Inventor: John O. Ryan, Cupertino, Calif.

[73] Assignee: Macrovision Corporation, Sunnyvale, Calif.

[21] Appl. No.: 287,800

[22] Filed: Aug. 9, 1994

[51] Int. Cl.$^6$ ..................................................... H04N 7/167
[52] U.S. Cl. .................................. 380/5; 380/3; 380/10; 358/296; 358/446; 360/60
[58] Field of Search ..................................... 380/10–20, 3, 380/5, 9, 10; 358/335; 360/37.1, 60

[56] References Cited

U.S. PATENT DOCUMENTS

| | | | |
|---|---|---|---|
| 4,307,416 | 12/1981 | Spano | 358/124 |
| 4,620,224 | 10/1986 | Lee et al. | 358/119 |
| 4,642,688 | 2/1987 | Lowry et al. | 380/11 |
| 5,113,439 | 5/1992 | Hashimoto | 380/7 |

Primary Examiner—Thomas H. Tarcza
Assistant Examiner—Hrayr A. Sayadian
Attorney, Agent, or Firm—Gerow D. Brill

[57] ABSTRACT

A video scrambling and descrambling system that produces color video that is difficult or annoying to watch by randomly switching the color components of a component or composite video. In the scrambling portion, component or composite video is decoded into a luminance component and its two color components. A random switching signal is generated to randomly switch the relationship of the color component signals. The randomly switched color component signals may be encoded together with the luminance signal to produce a component or composite video signal that is scrambled. The random switching signal may be transmitted as part of the encoded signal or through a separate data channel medium. A descrambling portion first separates the scrambled component or composite video signal into a luminance component and two scrambled color components. The random switching signal transmitted to the descrambler along with the scrambled video signal is used to restore the original relationship between the color component signals. The luminance component as well as the two descrambled color components are then encoded to produce a component or composite video with the relationship between the color components restored to their respective original positions in the video signal. The method may be used in various transmission and recording formats.

46 Claims, 8 Drawing Sheets

METHOD OF AND APPARATUS FOR SCRAMBLING A VIDEO SIGNAL WITH FULL NETWORK TRANSMISSION AND RECORDING CAPABILITY

CROSS-REFERENCE TO RELATED APPLICATIONS

This application is related to copending application U.S. Ser. No. 08/279592, by John O. Ryan, Apparatus and Method for Comprehensive Copy Protection For Video Platforms and Unprotected Source Material, filed Jul. 25, 1994.

BACKGROUND

1. Field of Invention

This disclosure is directed to a scrambling method and apparatus for use with any composite or component video transmission system.

2. Overview of Video Scrambling Systems

The various video scrambling systems implemented or proposed to date have in one way or another attempted to prevent a viewer from viewing certain pre-recorded or transmitted video programs. Many of these systems are complicated and require rather expensive implementation in the scrambler or descrambler or both.

Such a system is described in John O. Ryan U.S. Pat. No. 4,916,736, issued Apr. 10, 1990, and assigned to Macrovision Corporation, directed to having time sequential information signals having a time reference and an active video portion encrypted (scrambled) by time shifting the active video portion towards and away from the line reference signal in pseudo-random fashion before recording on tape or disk or transmission to the user. The signals are descrambled by an inverse time shifting technique.

Another system is described in John O. Ryan U.S. Pat. No. 5,058,157, issued Oct. 15, 1991, and assigned to Macrovision Corporation, directed to a similar time shifting of the active video in the scrambling process. The descrambling process is a much less expensive implementation whereby the descrambled signal contains some time base errors that are within the capture or correction range of the follow-on monitor/receiver.

There are many other scrambling systems and methods that use such techniques as video inversion, line shuffling, and line cutting and rotation. These techniques suffer from expense problems or their inability to be recorded.

3. The Problem

There is a need for a simple scrambling system that is inexpensive to implement that can be recorded on consumer VCRs. Such a system does not need to make it impossible to view the scrambled picture, but such a viewing should lack commercial value or detract substantially from its enjoyment.

SUMMARY OF THE INVENTION

A video scrambling and descrambling system that produces color video that is difficult or annoying to watch by randomly switching the color components of a component or composite video signal.

In the scrambling portion the component or composite video is decoded into a luminance component and its two color components. A random switching signal is generated to randomly switch the relationship of the color component signals. The randomly switched color component signals are encoded together with the luminance signal to produce a component or composite video signal that is scrambled. The random switching signal is transmitted as part of the encoded signal or by way of a separate data channel.

A descrambling portion first separates the scrambled component or composite video signal into a luminance component and two scrambled color components. The random switching signal transmitted to the descrambler along with the scrambled video signal is used to restore the original relationship between the color component signals. The luminance component as well as the two descrambled color components are then encoded to produce a component or composite video with the relationship between the color components restored to their respective original positions in the video signal.

The object of the invention is to produce a method to scramble a video signal at a low cost and not limit the ability of scrambled signal to be transmitted in normal transmission channels or recorded on all presently known video media.

These and other features, aspects, and advantages of the present invention will become better understood with regard to the following description, appended claims and accompanying drawings.

DETAILED DESCRIPTION OF THE INVENTION

Figure 1:
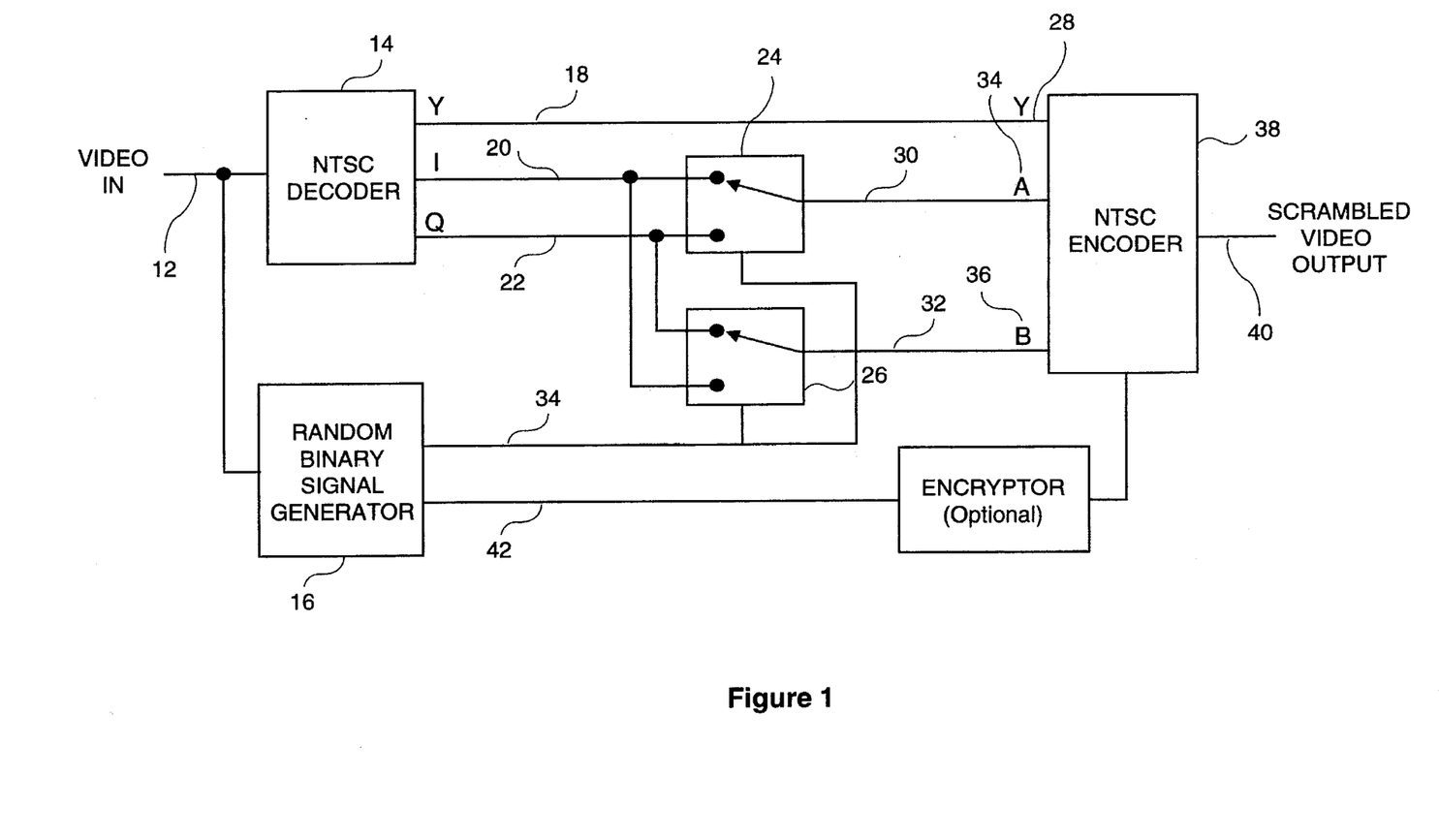
FIG. 1 shows a block diagram of a system of scrambling a NTSC video signal.
Figure 2:
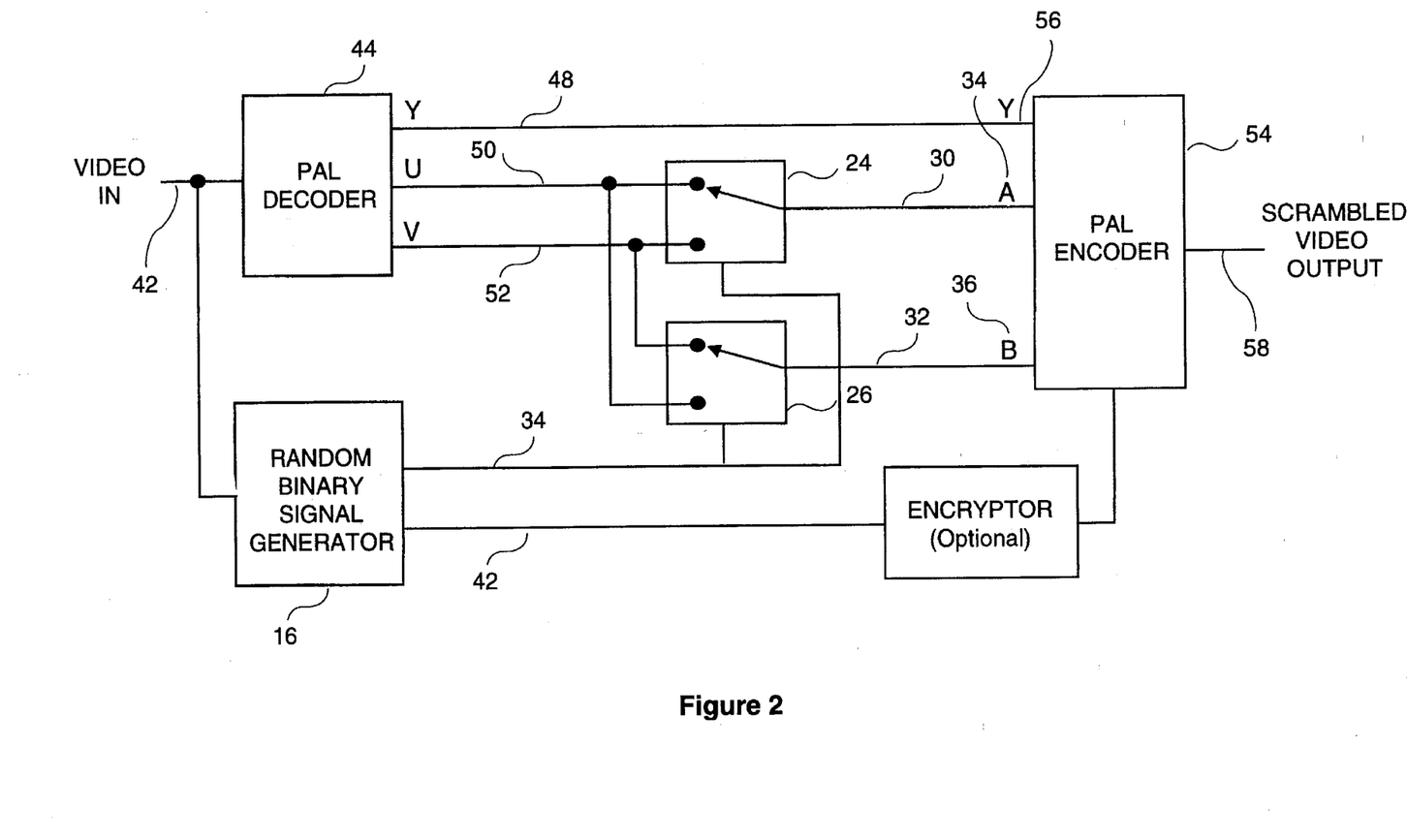
FIG. 2 shows a block diagram of a system of scrambling a PAL video signal.
Figure 3:
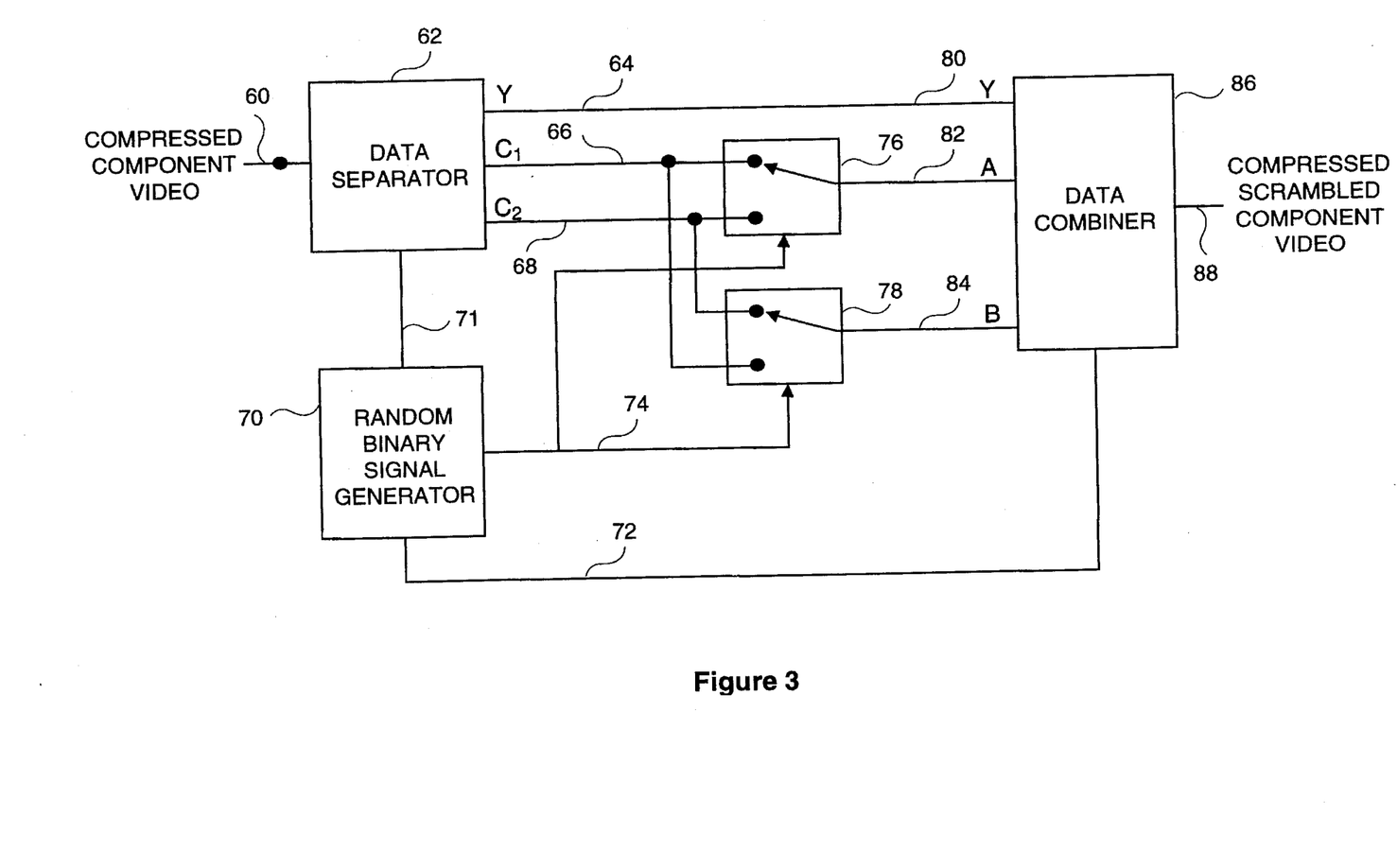
FIG. 3 shows a block diagram of a system of scrambling a Component Video signal.
Figure 4:
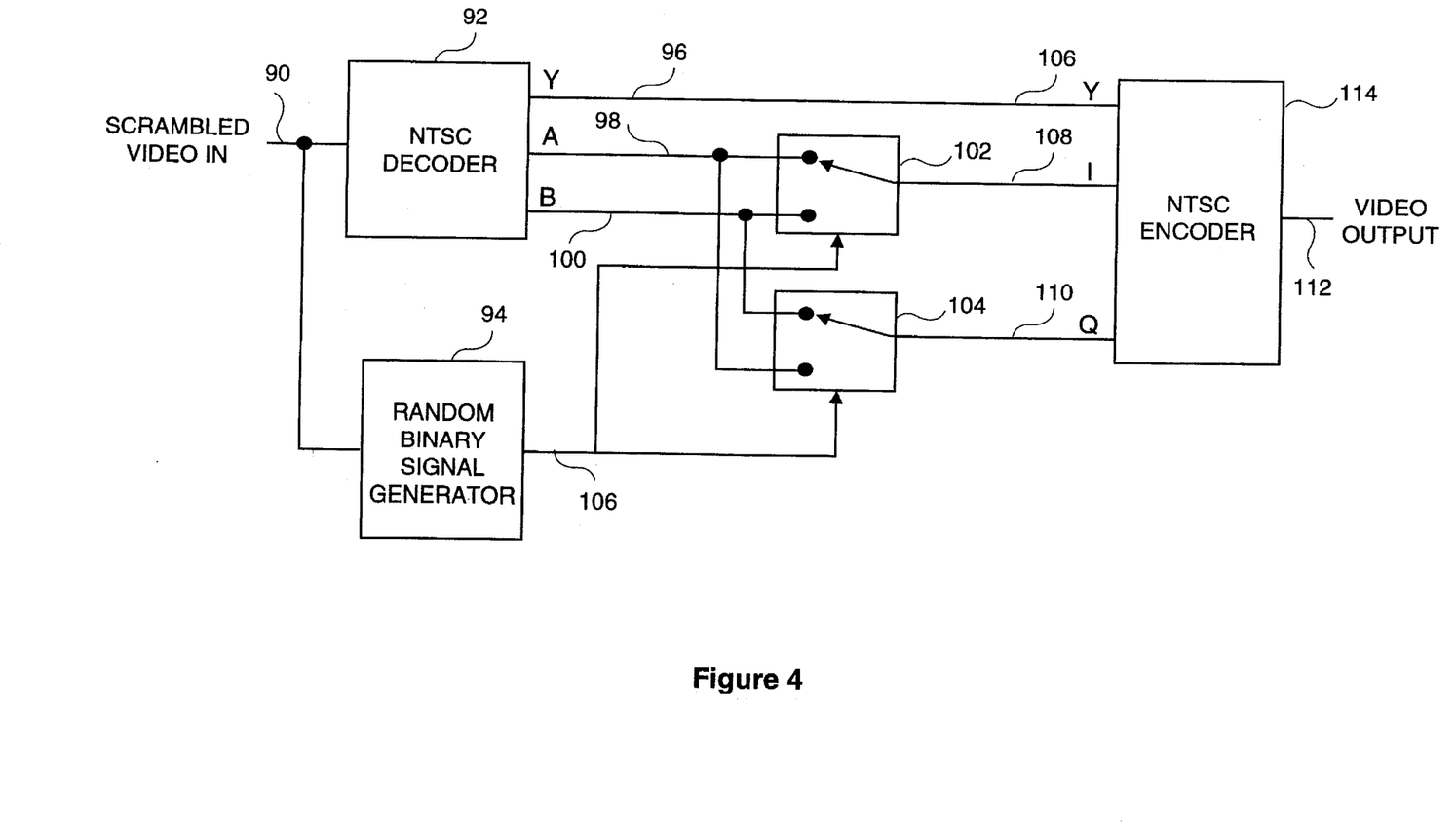
FIG. 4 shows a block diagram of a system of descrambling a scrambled NTSC video signal.
Figure 5:
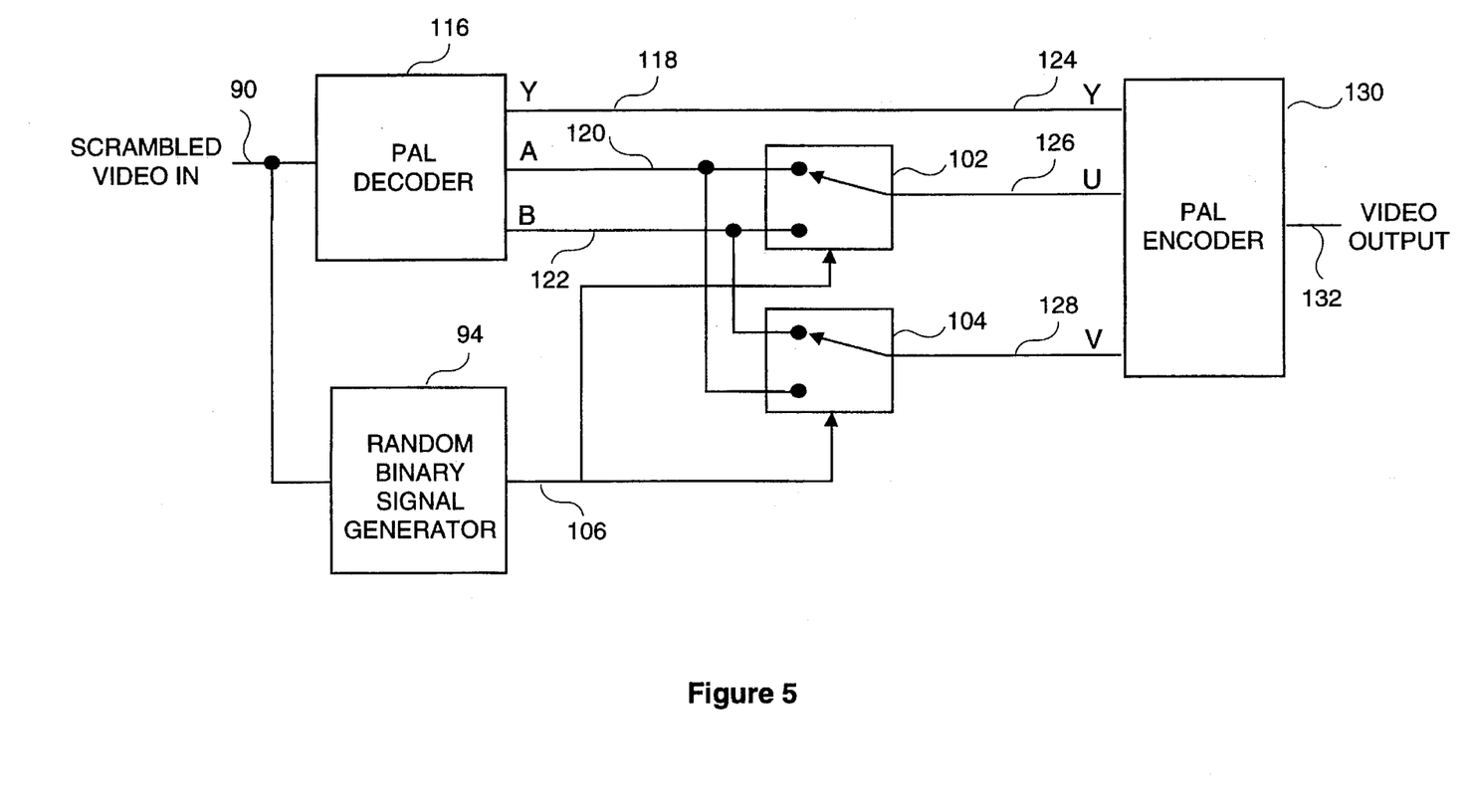
FIG. 5 shows a block diagram of a system of descrambling a scrambled PAL video signal.
Figure 6:
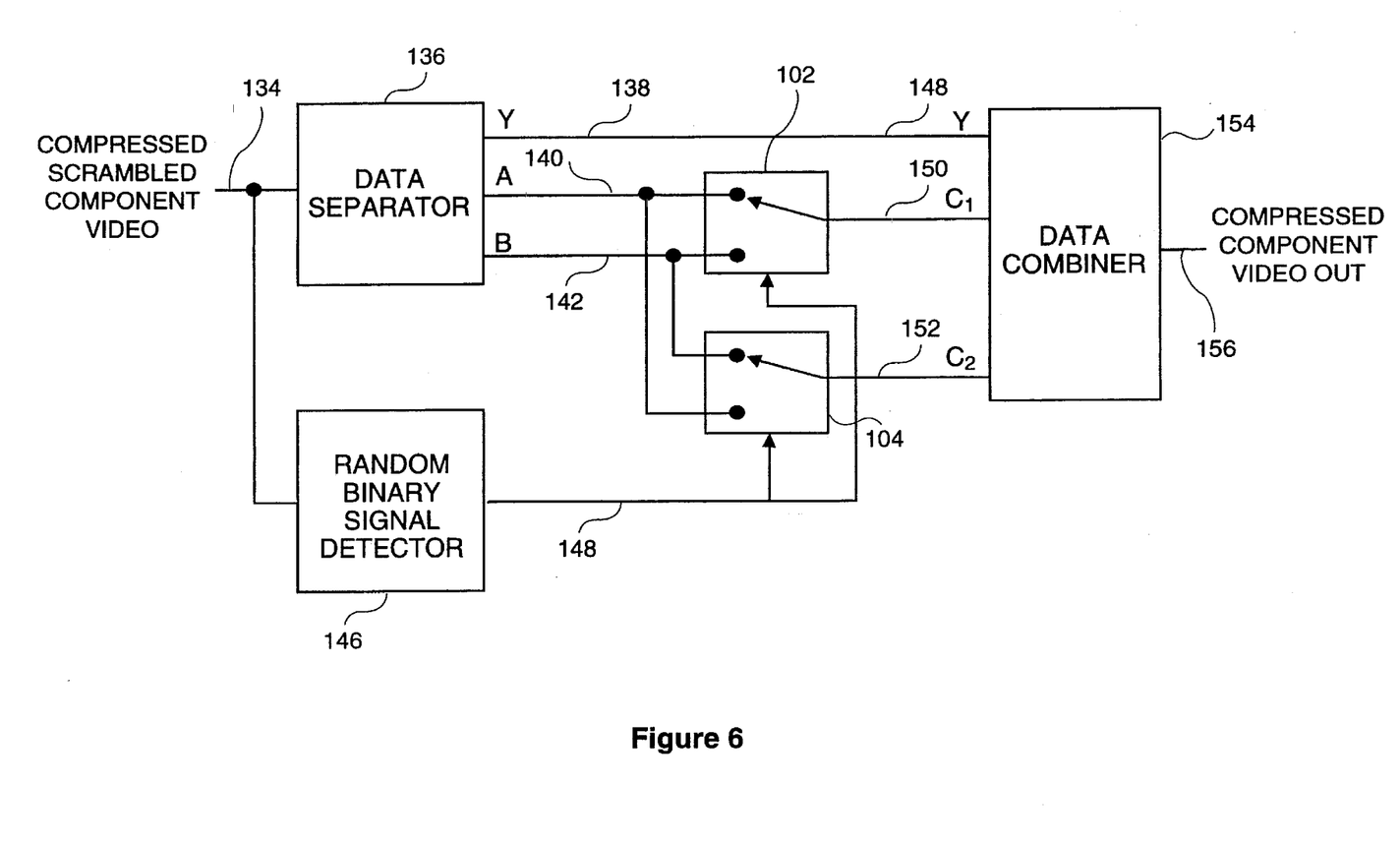
FIG. 6 shows a block diagram of a system of descrambling a descrambled Component Video signal.

FIGS. 1–3 show various scrambling apparatuses according to the present invention. FIGS. 4–6 show various descrambling apparatuses. The 7 and 8 describe CD-Video Disc implementation of the invention. Each block includes conventional elements currently commercially available or readily constructed by one of ordinary skill according to the following description. The recording medium may be (1) a video cassette, (2) a reel-to-reel recording, or (3) a disc format such as CD-Video.

FIG. 1 is block diagram describing an NTSC implementation of the invention. The color video scrambler of FIG. 1 contains all the elements needed to provide the scrambling functions of the invention. A Composite NTSC Video Signal 12 is coupled to a NTSC Decoder 14 and Random Binary Signal Generator 16. NTSC Decoder 14 decodes Composite NTSC Video Signal 12 into Luminance Component 18, First Color Component Signal 20, which may be an I or a R-Y signal and Second Color Component 22, which may be a Q signal or a B-Y signal, using techniques well known to one skilled in the art of television engineering. The Composite NTSC Video Signal 12 is also coupled to Random Binary Signal Generator 16. Random Binary Generator 16 generates a random binary signal as Key Signal 34 based on a triggering pulse derived from Composite NTSC Video Signal 12 at either the field or line rate.

First Color Component 20 is coupled to a first input of First Selector 24 and to a second input of Second Selector 26. Second Color Component 22 is coupled to a first input of Second Selector 26 and to a second input of First Selector 24. Selectors 24 and 26 are controlled by Key Signal 34 to select between said first and second color components.

As can be seen from FIG. 1, the first selector and the second selectors select opposite signals between the first and second color component signals. At all times the outputs of the selectors have different color component signals.

Luminance Component, Y, 18, the output of First Selector 24, Color Component A, 30 and the output of Second Selector 26, Color Component B 32 are respectively coupled to a Luminance Input 28, a first color input 34 and a second color input 36 of NTSC Encoder 38, thus producing Scrambled Composite Color Output 40.

Key Signal 34 is coupled to an optional encryption key generator (not shown) to provide additional security by encrypting Key Signal 34. Key Signal 34 or the output of the encryption key generator is coupled to the vertical blanking interval of NTSC Encoder 38 as Key Signal 42 to be combined with and be a part of the Scrambled Composite Video Output.

FIG. 1 is a NTSC embodiment of the scrambling portion of the scrambling-descrambling system. FIG. 2 is a PAL implementation using the same principle and many of the common elements of the NTSC implementation. Elements 42, 44, 48, 50, 52, 54, 56 and 58 are PAL discrete elements similar to Elements 12, 14, 18, 20, 22, 38, 28 and 40 which NTSC elements. Elements 16, 24, 26, 30, 34, 36 and 42 in the NTSC implementation are common with the same elements in the PAL implementation.

In FIG. 3, another version of the invention utilizes a component video implementation of the scrambling system. The switching function for the scrambling is done following the concepts shown FIG. 1.

Compressed Component Video Signal 60 is coupled to Data Separator 62 that separates the Compressed Component Video Signal 60 into Luminance Component Signal 64 as a Y signal, First Color Component Signal, $C_1$ 66 and Second Color Component Signal, $C_2$ 68. First Color Component Signal, $C_1$ 66 is coupled to a first input of First Selector 76 and to a second input of Second Selector 78. Second Color Component Signal $C_2$ is coupled to a first input of Second Selector 78 and to a second input of First Selector 76.

Additionally Data Separator 62 provides a Synchronizing Signal 71 indicating a line or field switching rate. Synchronizing Signal 71 is coupled to Random Binary Signal Generator 70 that generates a Random Binary Signal that is triggered at a line or field rate. This random binary signal acts a Key Signal 74. Selectors 76 and 78 are controlled by Key Signal 74 to select between the first and second color components.

As can be seen from FIG. 3, First Selector 76 and Second Selector 76 select opposite signals between the first and second color component signals. At all times the outputs of the selectors have different color component signals.

Luminance Component, Y, 64; the output of First Selector 76, Color Component A, 82; and the output of Second Selector 78, Color Component B 84 are respectively coupled to a Luminance Input 80, a first color input and a second color input of Data Combiner 86, thus producing Scrambled Component Color Output 88.

A signal similar to Key Signal 74, Signal 72 is coupled to an optional encryption key generator (not shown) to provide additional security by encrypting Key Signal 72. Signal 72 or the output of the optional encryption key generator is coupled to Data Combiner 86 to combine either Signal 72 or the encrypted key signal with the Compressed Scrambled Component Color Output 88.

FIG. 4 describes a descrambling implementation of the invention. Scrambled Composite NTSC Video Signal 90 is coupled to NTSC Decoder 92 and to Random Binary Signal Detector 94. NTSC Decoder 92 separates Scrambled Composite NTSC Video Signal 90 into Luminance Component (Y) 96, and the two color components, First Scrambled Color Component A, 98, and Second Scrambled Color Component B, 100, using conventional and well know techniques.

First Scrambled Color Component, A, 98 is coupled to a first input of First Selector 102 and a second input of Second Selector 104. Second Scrambled Color Component, B 100 is coupled to a first input of Second Selector 104 and to a second input of First Selector 102.

Scrambled Composite NTSC Video Signal 90 is also coupled to Random Binary Signal Detector 94. Random Binary Signal Detector 94 detects Signal 42, see FIG. 1, (that may be an encrypted signal) to generate Random Binary Signal 106 that parallels Key Signal 34 used in the scrambling process. First Selector 102 and Second Selector 104 are controlled by Random Binary Signal 106 to select between First Scrambled Color Component A 98 and Second Color Scrambled Component B 100.

As can be seen from FIG. 3, First Selector 102 and Second Selector 104 select opposite signals between the first and second scrambled color component signals. AT all times the output of the selectors have different color component signals. As a result of the descrambling process, the outputs of Selectors 102 and 104 restore the normal relationship between the color components.

The outputs of Selectors 102 and 104, that are descrambled color component signals, are respectively coupled to an I or R-Y Input, 108 and a Q or B-Y Input, 110 of NTSC Encoder 114. Additionally, Luminance Component Y 96 is coupled to Luminance Input 106 of NTSC Encoder 114. NTSC Encoder 114 produces NTSC Composite Video Output 112 using conventional techniques with the relationship between the color components fully restored.

FIG. 4 is a NTSC implementation of the descrambling portion of the scrambling-descrambling system. FIG. 5 is a PAL implementation using the same principle and many of the common elements of the NTSC implementation. Elements 116, 118, 120, 122, 124, 126, 128, 130 and 132 are PAL discrete elements similar to Elements 92, 96, 98, 100, 106, 108, 110, 114 and 112 that are NTSC elements. Elements 90, 94, 102, and 104 and 106 in the NTSC implementation are common with the same elements in the PAL implementation.

FIG. 6 describes an implementation for descrambling of a scrambled compressed component video signal. Scrambled Compressed Component Video Signal 134 is coupled to Data Separator 136. Data Separator 136 separates Scrambled Compressed Component Video 134 into a Compressed Luminance Component Signal 138, and the two color components, First Scrambled Color Component A, 140, and Second Scrambled Color Component B, 142, using conventional and well know techniques.

First Scrambled Color Component, A, 140 is coupled to a first input of First Selector 102 and a second input of Second Selector 104. Second Scrambled Color Component, B 142 is coupled to a first input of Second Selector 104 and to a second input of First Selector 102.

Scrambled Compressed Component Video Signal 134 is also coupled to Random Binary Signal Detector 146. Random Binary Signal Detector 146 detects Signal 72 (which may be encrypted) to generate Random Binary Signal 148 that parallels Key Signal 74 used in the scrambling process. If Signal 72 is encrypted, a decryptor (not shown) decrypts Signal 148. First Selector 102 and Second Selector 104 are controlled by Random Binary Signal 148 to select between First Scrambled Compressed Color Component A 140 and Second Color Scrambled Component B 142.

As can be seen from FIG. 6, First Selector 102 and Second Selector 104 select opposite signals between the first and second scrambled color component signals. At all times the outputs of the selectors have different color component signals. As a result of the descrambling process, the outputs of Selectors 102 and 104 restore the normal relationship between the color components.

The outputs of Selectors 102 and 104 that descrambled color component signals are respectively coupled to a $C_1$ Input, 150 and a $C_2$ Input, 152 of Data Combiner 154. Additionally, Luminance Component Y 138 is coupled to Luminance Input 148 of Data Combiner 154. Data Combiner 154 combines the Luminance Component and the descrambled Color Components $C_1$ and $C_2$ to produce Compressed Component Video Output 114 using conventional techniques with the relationship between the color components fully restored.

Figure 7:
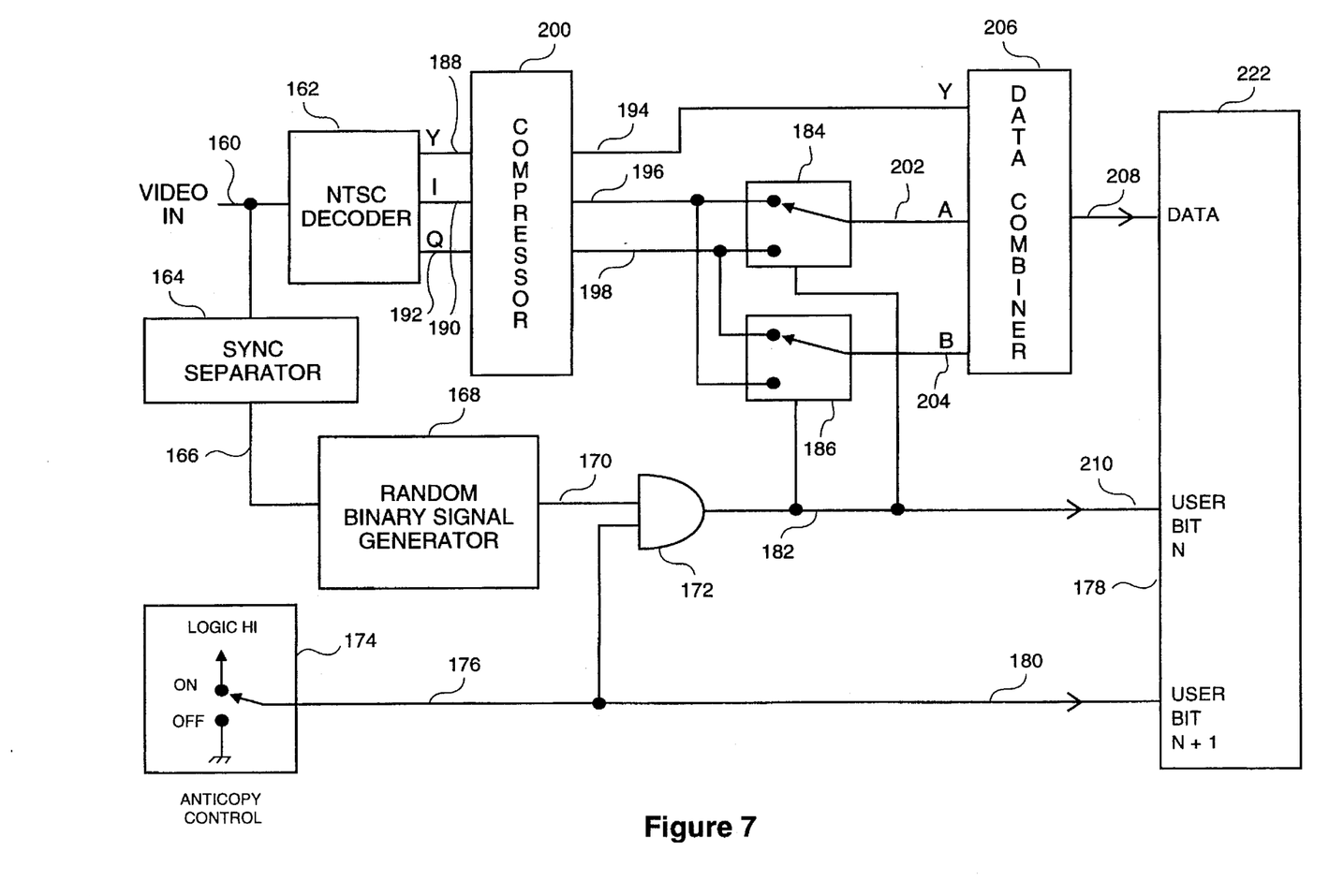
FIG. 7 shows a block diagram of an implementation of the scrambling method within a CD Video Disc system.

The implementations described about FIGS. 1–6 have been generalized descriptions of ways one skilled in the art may implement the features of video scrambling disclosed. FIG. 7 describes a specific implementation of the scrambling and recording portion relevant to CD-Video systems and incorporates well-known copy protection techniques. An NTSC implementation is discussed, but the concepts equally apply to a PAL or Component Video implementation.

A NTSC Composite Video Signal 160 is inputted to NTSC Decoder 162 and Sync Separator 164. Sync Separator 164 conventionally separates Vertical Sync Pulse 166 from NTSC Composite Video Signal 160. Vertical Sync Pulse 166 is coupled to Random Binary Signal Generator 168 to provide a trigger pulse for Random Binary Signal Generator 160. Random Binary Signal Generator 168 generates a Random Binary Signal 170 that is coupled to a first input of AND Gate 172.

Operator controlled Anticopy Control Switch 174 creates a logic high signal that acts as an Anticopy Signal 176 that is coupled to a second input of AND Gate 172. Anticopy Signal 176 is also coupled to Data Recording Electronics System 222 for recording as User Bit N+1 180.

AND Gate 172 creates Key Signal 182 to create the scrambling function if and only if Anticopy Control Switch 174 is in the "ON" position generated. If Anti Copy Switch 190 is on, Key Signal 182 is coupled to the control elements of First Selector 184 and Second Selector 186.

NTSC Decoder 162 decodes the NTSC Composite Video Signal 160 to produce outputs Luminance Component Y 188, a First Color Component I or R-Y 190 and a Second Color Component Q or B-Y 192. These components are inputted to Compressor 200 for video compression using well-known video compression techniques. Compressor 200 outputs a Compressed Luminance Signal 194, First Compressed Color Component $C_{1c}$ 196 and Second Compressed Color Component $C_{2c}$ 198. These compressed color components may be compressed versions of the I and Q signals discussed above.

First Compressed Color Component $C_{1c}$ 196 is coupled to a first input of First Selector 184 and a second input of Second Selector 186. Second Compressed Color Component $C_{2c}$ is coupled to a first input of Second Selector 186 and to a second input of First Selector 184.

As can be seen from FIG. 7, First Selector 184 and Second Selector 186 select opposite signals between the first and second color component signals. At all times the outputs of the selectors have different color component signals.

Luminance Component, Y, 194, the output of First Selector 184, Color Component A, 202 and the output of Second Selector 166, Color Component B 204 are combined in Data Combiner 206, thus producing Scrambled Component Color Data Output 208.

Key Signal 182 is coupled to an optional encryption key generator (not shown) to provide additional security by encrypting Key Signal 182. Key Signal 182 or the output of the optional encryption key generator is coupled to Data Recording Electronics System 222 for recording as User Bit N 210 as a key signal to be recorded with Scrambled Component Data Output 208 and User Bit N+1 180.

It is necessary to compress the various analog components into compressed components before the scrambling process because many compression systems look for differences between the signals on a field by field basis as means for eliminating any redundancy in the video signals in the compression process. Since field. If one were to scramble the color component signals before compression, false differences would be created, thus confusing the compression systems.

Figure 8:
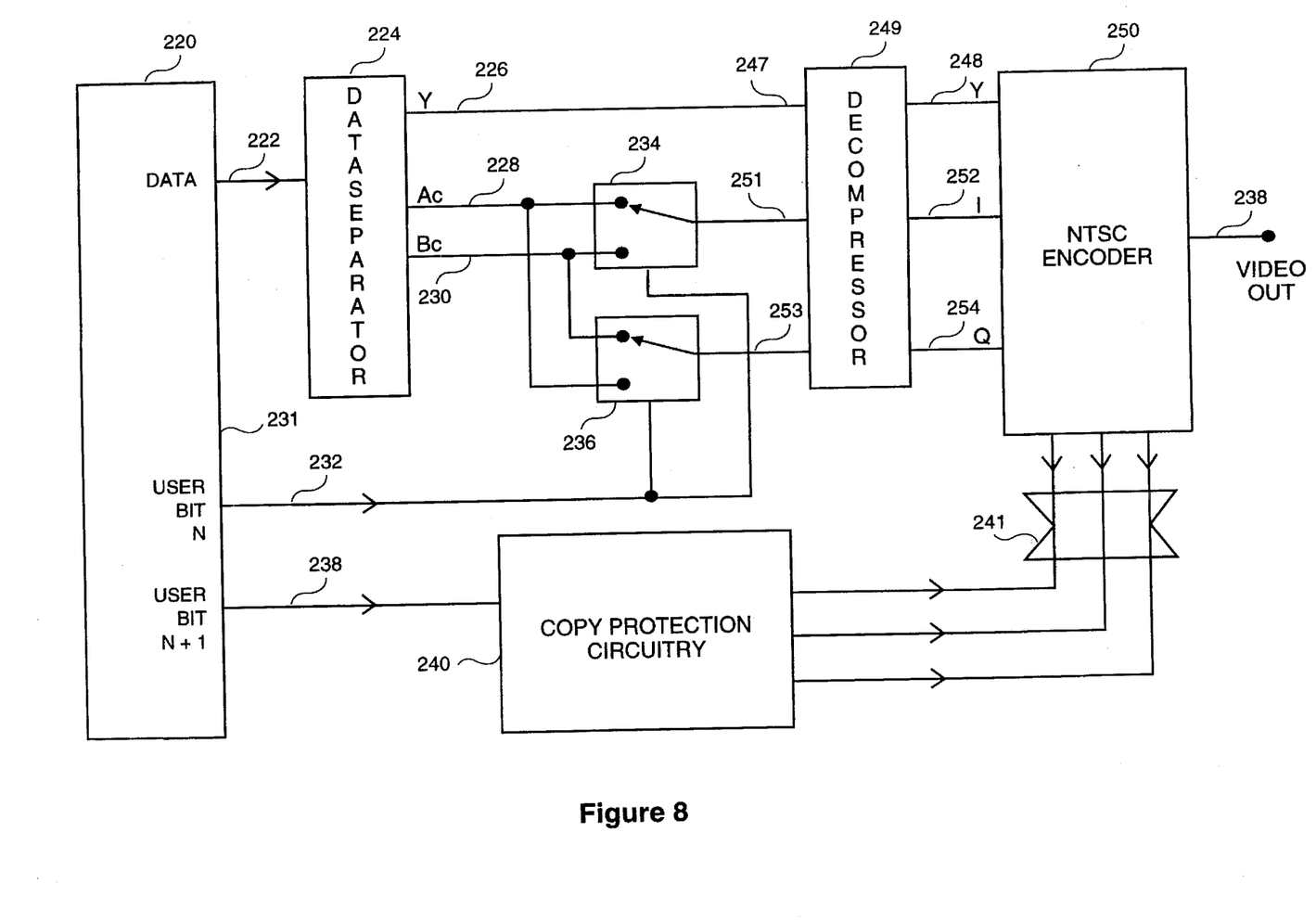
FIG. 8 shows a block diagram of an implementation of the descrambling method within a CD Video Disc system.

FIG. 8 describes a descrambler for the implementation described in FIG. 7. Along with the descrambling, FIGS. 7 and 8 show the additional use of copy protection in a CD-Video system.

Playback Electronics 220 has three output signals relevant to the descrambling and copy protection system for a CD-Video play back device. A first output is Data Output 222 that contains a Compressed Luminance Component $Y_c$ 226, First Scrambled Compressed Color Component $A_c$ 228 and Second Scrambled Compressed Color Component $B_c$ 230. Data Separator 224 separates these components and outputs them as shown in FIG. 8. Data Separator 224 separates Data Output 226 into discussed above using conventional and well know techniques.

First Scrambled Color Component, $A_c$, 228 is coupled to a first input of First Selector 234 and a second input of Second Selector 236. Second Scrambled Color Component, $B_c$ 230 is coupled to a first input of Second Selector 234 and to a second input of First Selector 236.

As can be seen from FIG. 8, First Selector 234 and Second Selector 236 select opposite signals between the first and second scrambled color component signals. At all times the outputs of the selectors have different color component signals. As a result of the descrambling process, the outputs of Selectors 234 and 236 restore the normal relationship between the color components.

The outputs of Selectors 234 and 236, that are descrambled color component signals, are respectively coupled to a First Descrambled Color Component Input 251 and a Second Descrambled Color Component Input 253 of Decompressor 249. Decompressor 249 also has Luminance Component Signal 247 as an input signal.

After Decompression the descrambled color component signals are coupled to an I or R-Y Input, 252 and a Q or B-Y Input, 254 of NTSC Encoder 250. Additionally, Luminance Component $Y_c$ 226 a decompressed luminance signal is coupled to Luminance Input 248 of NTSC Encoder 250. NTSC Encoder 250 encodes the Luminance Component and the descrambled and decompressed Color Components I and Q to produce Analog Composite Video Signal 254 using conventional techniques with the relationship between the color components fully restored.

The analog components are encoded as a NTSC Composite Video Signal 238 using conventional and well-known techniques.

User Bit N 232 acting as key signal is coupled to the control elements of First Selector 234 and Second Selector 236 in synchronization with Key Signal 182 in the scrambling portion described in FIG. 7.

User Bit N+1 Output 238 of Playback Electronics 220 is a logic signal controlled by Anticopy Control Switch 174 in the recording/scrambling portion described in FIG. 7. When Anticopy Control Switch 174 generates a logic high, User Bit N+1 in the descrambling portion is coupled to Copy Protection Circuitry 236 to generate Copy Protection Signals 241 to be added to an Encoded Video Output Signal 238.

These Copy Protection Signals may use the techniques described in various well-known copy protection schemes for video signals including that disclosed in John O. Ryan U.S. Pat. No. 4,631,603, Dec. 23, 1986, and assigned to Macrovision, incorporated by reference, directed to modifying an analog video signal to inhibit making of acceptable video recordings therefrom. This discloses adding a plurality of pulse pairs to the otherwise unused lines of a video signal vertical blanking interval, each pulse pair being a negative-going pulse followed closely by a positive-going pulse. The effect is to confuse AGC (automatic gain control circuitry) of a VCR (video cassette recorder) recording such a signal, so that the recorded signal is unviewable due to the presence of an excessively dark picture when the recorded signal is played back.

Another analog copy protection scheme is disclosed in Leonard U.S. Pat. No. 4,914,694 issued Apr. 3, 1990, and assigned to Eidak Corp., incorporated by reference. The Eidak system (see Abstract) increases or decreases the length of each video field from the standard length, either by changing the time duration of the respective horizontal line intervals in each field while keeping a constant, standard number of lines per frame, or by changing the number of horizontal line intervals that constitute a frame while maintaining the standard duration of each line interval.

These copy protection systems modify the video signal to be recorded (for instance on tape) or to be broadcast (for instance pay-per-view television programs) to make copying by ordinary VCRs difficult or impossible. When a copy protected signal is played back on the apparatus of FIG. 8 for viewing, the copy protection process is essentially transparent, i.e., it does not interfere with viewing. However, any attempt made to copy the video signal from the output of the apparatus of FIG. 8 using a VCR, yields a picture degraded to some extent, depending on the efficacy of the particular copy protection system. These present video copy protection systems protect only analog video signals which are the type of video signals broadcast and recorded using current consumer video technology.

In each of the described implementations, the purpose of the scrambling is to randomly reverse the proper transmission path of the color component signals through the recording or transmission process. An observer playing back or viewing an unscrambled recording will observe a random reversal of the proper colors in the picture, reducing the commercial value of the picture. Adding copy protection to the scrambling makes any copying of the scrambled and copy protected signal of significantly reduced commercial value to an illicit copy.

The scrambling and descrambling techniques described herein are used as the scrambler and descramblers in the embodiment of copending application U.S. Ser. No. 08/279542, by John O. Ryan, Apparatus and Method for Comprehensive Copy Protection For Video Platforms and Unprotected Source Material, filed Jul. 25, 1994, incorporated by reference.

The scrambling mechanism described is suitable for the "A" scrambler for use with the teachings above identified application in MPEG systems because it is compatible with:
1. The data compression system(s) used in the proposed new digital VCRs, disc players and set-top decoders.
2. The various "trick modes" of the proposed digital VCRs and disc players (fast forward and reverse, still frame, slow, etc.).

Additionally, these scrambling and descrambling functions are capable of being implemented at very low cost preferably by inclusion within integrated circuits performing other functions.

Scrambling in the digital domain is accomplished by randomly interchanging or reordering certain data blocks of the compressed serial data stream. For the "A" scrambler identified above the data corresponding to the $C_r$ and $C_b$ color difference components are reordered under the control of a random data bit. When the data bit is low, the $C_r$ and $C_b$ data are not reordered and when the data bit is high, the $C_r$ and $C_b$ data are reordered. This data bit is then combined with the serial data stream (at a specific location in the ancillary data packet) to provide descrambling information and its random low/high excursions become the Copyright Signature.

Though not sufficient to completely obliterate the image, this form of scrambling generates very severe low frequency color noise which removes all entertainment value from the program.

To ensure compatibility with the data compression systems and trick modes of the various digital video devices, the random data bit controlling $C_r$ and $C_b$ data reordering is only allowed to change state between MPEG data frames and this data bit is included at least once in every MPEG data frame (in the ancillary data packet) to control descrambling and to represent the Copyright Signature. Each MPEG data frame therefore contains all the information needed to interpret and descramble the image.

The "A" and "B" scrambling mechanisms in Ser. No. 08/279542 are identical except that certain data bits defining the $C_r$ and $C_b$ color signals are inverted as well as interchanged, in response to the random data bit defining the Copyright Signature.

The above description is illustrative and not limiting. Further modifications will be apparent to one of ordinary skill in the art in light of this disclosure.

I claim:

1. A method of scrambling a video signal, comprising the steps of:

decoding said video signal into a luminance component, a first color component and a second color component;

generating a key signal;

using a first selector controlled by said key signal to select between said first and second color components;

using a second selector controlled by said key signal to select between said first and second color components, wherein said first selector and said second selector select opposite signals from said first and second color component signals;

coupling said luminance component signal, an output of said first selector and an output of said second selector respectively to a luminance input, a first color input and a second color input of an encoder, thus producing a scrambled color output; and coupling said key signal to said encoder to combine said key signal said key signal with said key signal.

2. A method as in claim 1 wherein said encoder and decoder process NTSC signals.

3. A method as in claim 1 wherein said encoder and decoder process PAL signals.

4. A method as in claim 1 wherein said key signal generator generates a random binary signal generator.

5. A method as in claim 1 wherein said random binary signal generator generates switching pulses coincident with field rate pulses.

6. A method as in claim 1 wherein said random binary signal generator generates switching pulses coincident with line rate pulses.

7. A method as in claim 1, wherein said key signal is coupled to a vertical blanking interval of said scrambled color output signal.

8. A method as in claim 1, wherein said key signal is encrypted prior to being combined with said color composite output signal.

9. A method of scrambling a component video signal, comprising the steps of:

separating said component video signal into a luminance component, a first color component and a second color component;

generating a key signal;

using a first selector controlled by said key signal to select between said first and second color components;

using a second selector controlled by said key signal to randomly select between said first and second color components, wherein said first selector and said second selector select opposite signals said first and second color component signals;

coupling said luminance component signal, an output of said first selector and an output of said second selector to a luminance input, a first color input and a second color input of a compressor thus producing a scrambled component color output; and coupling said key signal to said compressor to combine said scrambled composite output with said key signal.

10. A method as in claim 9, wherein said component video signal comprises 525 lines and 60 fields.

11. A method as in claim 9, wherein said component video signal comprises 625 lines and 50 fields.

12. A method as in claim 9, wherein said key signal is a random binary signal.

13. A method as in claim 12, wherein said random binary signal comprises switching pulses coincident with field rate pulses.

14. A method as in claim 12 wherein said random binary signal comprises switching pulses coincident with line rate pulses.

15. A method of descrambling a scrambled video signal, comprising the steps of:

decoding said scrambled video signal into a luminance component, a first scrambled color component and a second scrambled color component;

detecting a key signal;

using a first selector controlled by said key signal to select between said first and second scrambled color components;

using a second selector controlled by said key signal to randomly select between said first and second color components, wherein said first selector and said second selector selects an opposite signal from said first and second color scrambled component signals;

coupling said luminance component signal, an output of said first selector and an output of said second selector respectively to a luminance input, a first color input and a second color input of an encoder thus producing a composite color output with said color components restored to their prescrambled relationship.

16. A method as in claim 15 wherein said encoder and decoder process NTSC signals.

17. A method as in claim 15 wherein said encoder and decoder process PAL signals.

18. A method as in claim 15 wherein said key signal comprises switching pulses coincident with field rate pulses.

19. A method of descrambling a scrambled component video signal, comprising the steps of:

separating said scrambled component video signal into a luminance component, a first scrambled color component and a second scrambled color component;

detecting a random binary signal;

using a first selector controlled by said random binary signal to randomly select between said first and second scrambled color components;

using a second selector controlled by said random binary signal to randomly select between said first and second scrambled color components, wherein said first selector and said second selector select opposite signals from said first and second color component signals;

coupling said luminance component signal, an output of said first selector and an output of said second selector to a luminance input, a first color input and a second color input of a compressor thus producing a descrambled component color output.

20. A method as in claim 19 wherein said component video signals comprise 525 lines and 60 fields.

21. A method as in claim 19 wherein said component video signals comprise 625 lines and 50 fields.

22. A method as in claim 19 wherein said key signal comprises switching pulses coincident with field rate pulses.

23. A method as in claim 19 wherein a random binary signal generator generates switching pulses coincident with line rate pulses.

24. An apparatus for scrambling a video signal, comprising:

a decoder for decoding said video signal into a luminance component, a first color component and a second color component;

a generator for generating a key signal;

a first selector controlled by said key signal to select between said first and second color components;

a second selector controlled by said key signal to select between said first and second color components, wherein said first selector and said second selector select opposite signals from said first and second color component signals;

said luminance component signal, an output of said first selector and an output of said second selector are coupled respectively to a luminance input, a first color input and a second color input of an encoder, thus producing a scrambled composite color output; and said key signal is coupled to said encoder to combine said key signal with said scrambled composite output.

25. An apparatus as in claim 24 wherein said encoder and decoder process NTSC signals.

26. An apparatus as in claim 24 wherein said encoder and decoder process PAL signals.

27. An apparatus as in claim 24 wherein said key signal generator is a random binary signal generator which generates a random binary signal.

28. An apparatus as in claim 27 wherein said random binary signal generator generates switching pulses coincident with field rate pulses.

29. An apparatus as in claim 23 wherein said random binary signal generator generates switching pulses coincident with line rate pulses.

30. An apparatus for scrambling a component video signal, comprising the steps of:

a data separator for separating said component video signal into a luminance component, a first color component and a second color component;

a generator for generating a key signal;

a first selector controlled by said key signal to select between said first and second color components;

a second selector controlled by said key signal to randomly select between said first and second color components, wherein said first selector and said second selector select opposite signals from said first and second color component signals;

said luminance component signal, an output of said first selector and an output of said second selector are respectively coupled to a luminance input, a first color input and a second color input of a compressor thus producing a scrambled component color output; and said key signal is coupled to said compressor to combine said scrambled composite output with said key signal.

31. An apparatus as in claim 30, wherein said component video signals are 525 lines and 60 fields.

32. An apparatus as in claim 30, wherein said component video signals comprise 625 lines and 50 fields.

33. An apparatus as in claim 30, wherein said random binary signal generator generates switching pulses coincident with field rate pulses.

34. An apparatus as in claim 30, wherein said random binary signal generator generates switching pulses coincident with line rate pulses.

35. An apparatus for descrambling a scrambled video signal, comprising:

a decoder for decoding said scrambled video signal into a luminance component, a first scrambled color component and a second scrambled color component;

a detector for detecting a key signal;

a first selector controlled by said key signal to select between said first and second scrambled color components;

a second selector controlled by said signal to select between said first and second color components, wherein said first selector and said second selector selects an opposite signal from said first and second color scrambled component signals;

said luminance component signal, an output of said first selector and an output of said second selector are respectively coupled to a luminance input, a first color input and a second color input of an encoder thus producing a composite color output with said color components restored to their prescrambled relationship.

36. An apparatus as in claim 35 wherein said encoder and decoder process NTSC signals.

37. An apparatus as in claim 35 wherein said encoder and decoder process PAL signals.

38. An apparatus as in claim 35, wherein said key signal is generated by a random binary signal generator and is a random binary signal.

39. An apparatus as in claim 35 wherein said random binary signal has pulses coincident with field rate pulses.

40. An apparatus as in claim 35 wherein said random binary signal has pulses coincident with line rate pulses.

41. An apparatus for descrambling a scrambled component video signal, comprising:

a a data separator for separating said scrambled component video signal into a luminance component, a first scrambled color component and a second scrambled color component;

a detector for detecting a key signal;

a first selector controlled by said key signal to randomly select between said first and second scrambled color components;

a second selector controlled by said key signal to select between said first and second scrambled color components, wherein said first selector and said second selector select opposite signals from said first and second color component signals;

said luminance component signal, an output of said first selector and an output of said second selector are respectively coupled to a luminance input, a first color input and a second color input of a compressor thus producing a descrambled component color output.

42. An apparatus as in claim 41 wherein said apparatus descrambles 525 line, 60 field signals.

43. An apparatus as in claim 41 wherein said apparatus descrambles 625 line, 50 field signals.

44. An apparatus as claim 41, wherein said key signal is generated by a random binary signal generator and is a random binary signal.

45. An apparatus as in claim 41, wherein said random binary signal consists of switching pulses coincident with field rate pulses.

46. An apparatus as in claim 41, wherein said random binary signal consists of switching pulses coincident with line rate pulses.

* * * * *